United States Patent [19]

Van Breemen

[11] Patent Number: 5,090,776
[45] Date of Patent: Feb. 25, 1992

[54] WHEEL HUB AND WHEEL FOR A BICYCLE

[76] Inventor: Eric H. G. Van Breemen, Brongouw 114, 1352 EK Almere, Netherlands

[21] Appl. No.: 486,877

[22] Filed: Feb. 20, 1990

[30] Foreign Application Priority Data

Feb. 20, 1989 [NL] Netherlands .......................... 8900409

[51] Int. Cl.⁵ .............................................. B60B 21/00
[52] U.S. Cl. .......................... 301/105 B; 301/63 PW; 301/9 CN
[58] Field of Search ................ 301/9 R, 9 DN, 9 DH, 301/9 AN, 9 AH, 9 DP, 9 DH, 9 CN, 9 S, 9 AC, 63 PW, 105 R, 105 B, 105 S, 104

[56] References Cited

U.S. PATENT DOCUMENTS

| | | | |
|---|---|---|---|
| 1,602,984 | 10/1926 | McFall | 301/9 CN |
| 3,170,549 | 2/1965 | Baker, III | 301/105 B X |
| 3,782,778 | 1/1974 | Tomozawa | 301/9 DN |
| 3,843,202 | 10/1974 | Lacerte | 301/63 PW |
| 4,351,569 | 9/1982 | Steuer et al. | 301/105 B X |
| 4,527,839 | 7/1985 | Fujitaka et al. | 301/63 PW X |
| 4,571,005 | 2/1986 | Nowak et al. | 301/63 PW |
| 4,844,552 | 7/1989 | Tsygankov et al. | 301/105 B X |
| 4,930,844 | 6/1990 | Giroux | 301/105 B X |

FOREIGN PATENT DOCUMENTS

| | | |
|---|---|---|
| 0195418 | 9/1986 | European Pat. Off. . |
| 2327907 | 5/1977 | France . |
| 10414 | 2/1924 | Netherlands . |
| 159011 | 2/1921 | United Kingdom . |
| 241144 | 10/1925 | United Kingdom . |
| 573423 | 11/1945 | United Kingdom ............ 301/105 B |

*Primary Examiner*—Russell D. Stormer
*Attorney, Agent, or Firm*—Young & Thompson

[57] ABSTRACT

A wheel hub for a bicycle is provided with a bearing housing (1) and a detachable sleeve (6) fitted all round the bearing housing (1) and supporting the wheel. The sleeve (6) may be clamped between a fixed flange (3) and a loose flange (5) on the bearing housing (1). The wheel hub may be incorporated in a spoked wheel or in a disc wheel. The disc wheel (10) is provided with a central hole, into which sleeve halves (13a, 13b) are fitted each provided with a sleeve flange. The sleeve flanges are fitted on either side of the disc wheel (10), and are clamped together between the fixed flange (3) and the loose flange (5).

6 Claims, 4 Drawing Sheets

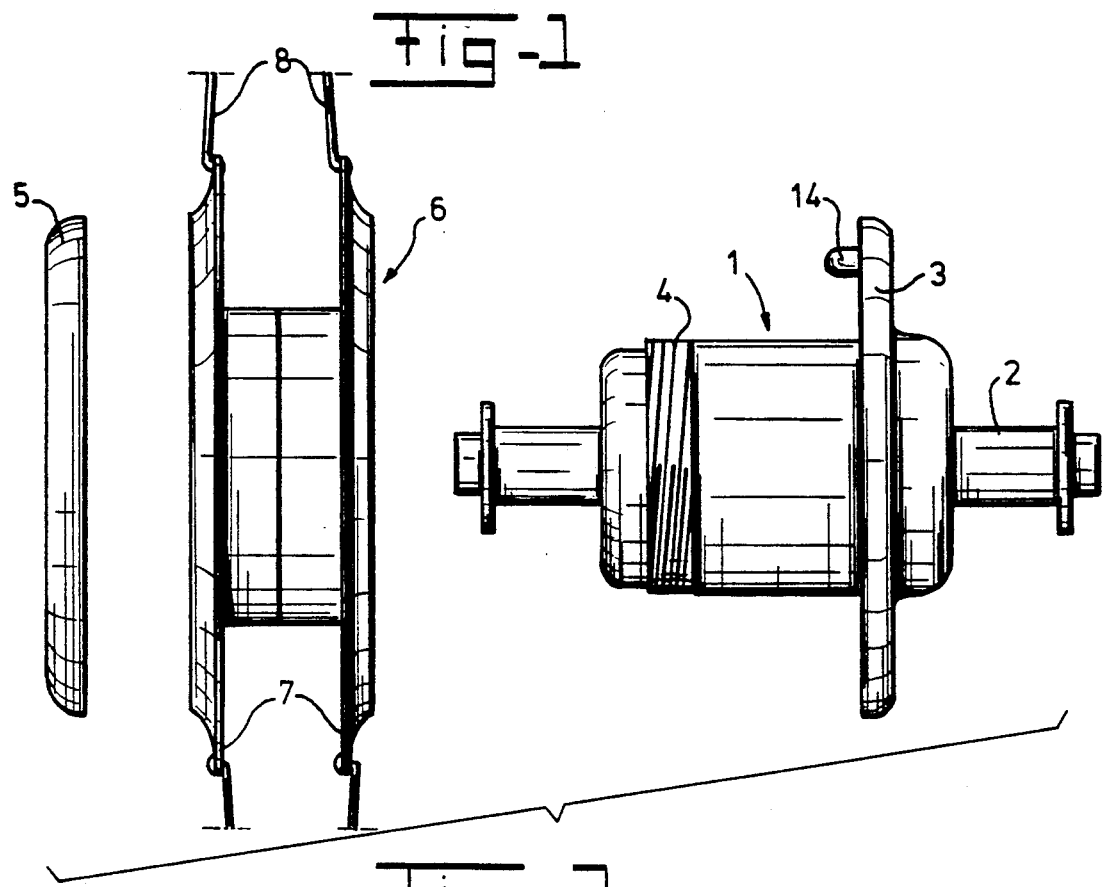
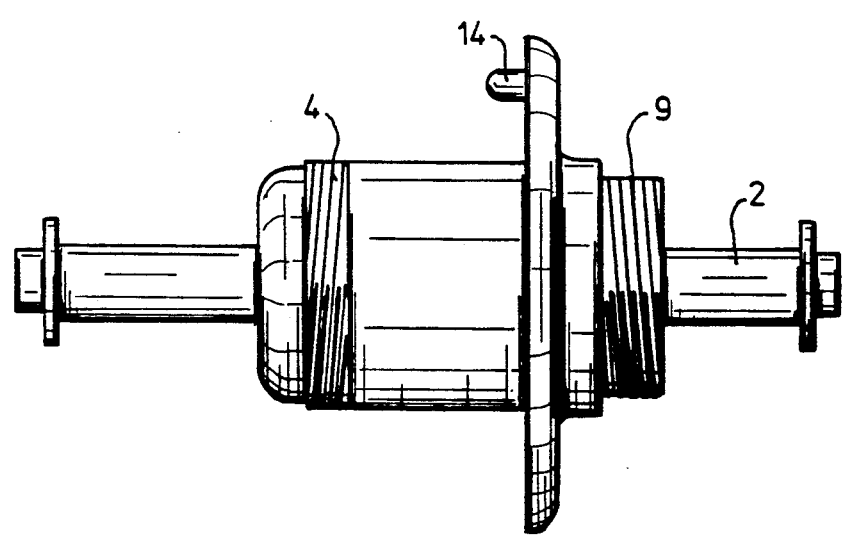

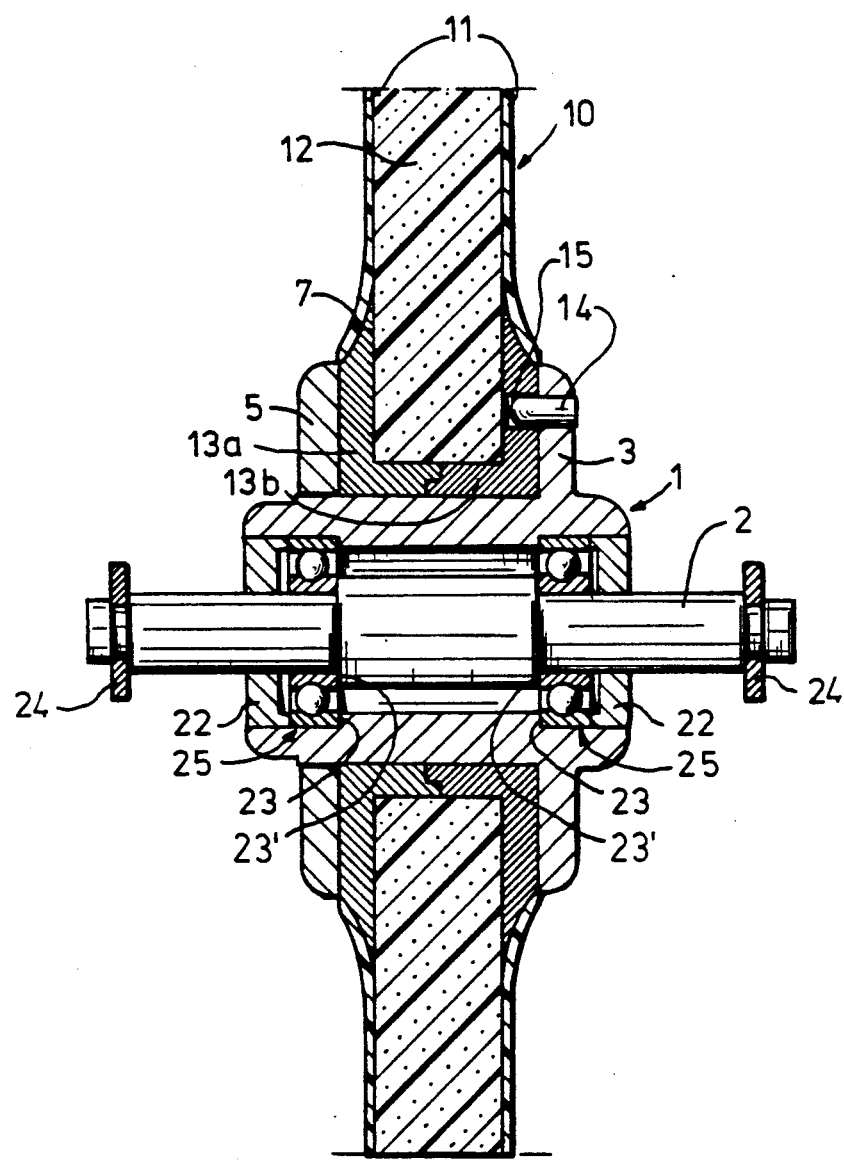

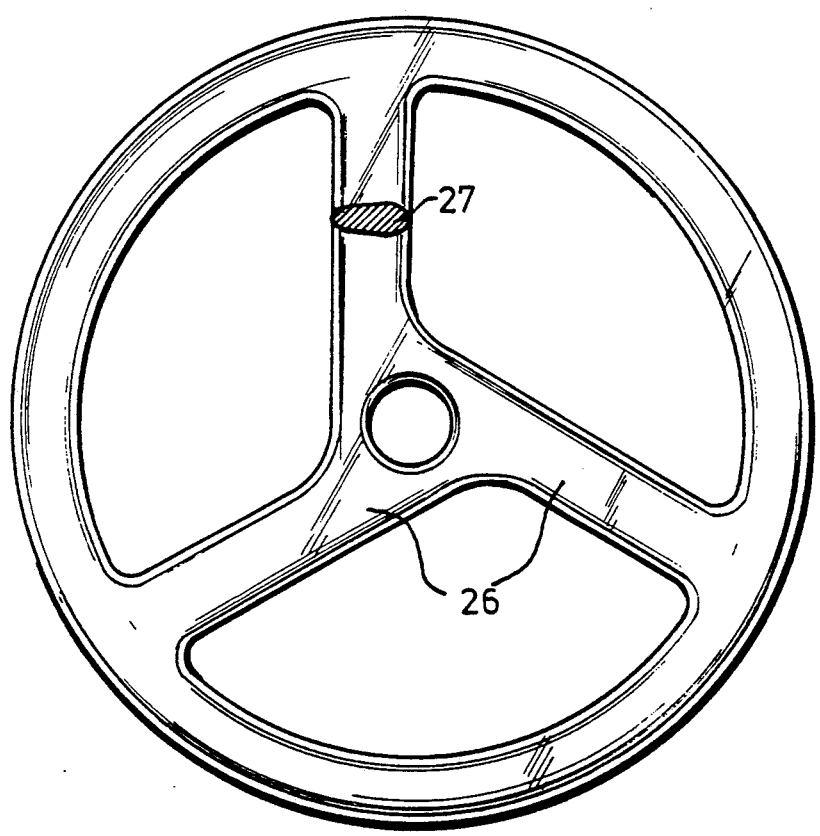

WHEEL HUB AND WHEEL FOR A BICYCLE

The present invention relates to a wheel hub for a bicycle, provided with a bearing housing which is mounted so that it is rotatable about an axle and is intended for supporting a wheel.

Such wheel hubs are known. The wheel in this case is fixed to the wheel hub in such a way that together they form a single unit. In certain applications this is no problem, such as, for example, in cases where the same wheel is used permanently.

In other cases it can, however, be desirable to change the wheel more often, for example in cycle racing. In this case it is attractive if wheel hub and wheel are not fixed permanently to each other, so that only a limited number of parts need be changed. The changing can then take place relatively quickly. For other reasons also, it can be attractive to connect wheel and wheel hub to each other in a non-permanent manner, for example for manufacturing reasons.

The object of the invention is therefore to produce a wheel hub which makes it possible to fit or remove the wheel simply and quickly. This is achieved through the bearing housing being provided with a detachable sleeve all round the bearing housing by means of which the wheel is supported on the bearing housing.

In use, the sleeve now forms a rigid connection between bearing housing and wheel, making the ride characteristics thereof the same as those of a known wheel.

At the same time, however, the unit comprising the wheel and sleeve can simply be slid off the bearing housing after loosening, and the wheel hub remains behind. This can be carried out much more quickly than the removal of a known wheel, where the entire wheel hub has to be loosened and removed.

The sleeve and the wheel hub can be fastened to each other in different ways. The wheel hub is preferably designed in such a way that the bearing housing is provided with a fixed external flange, that a loose flange is also provided, and that the sleeve can be clamped between loose and fixed flange when the loose flange is being fitted on the bearing housing.

Provision is preferably made for the loose flange to have an internally threaded aperture which can be fixed on an external screw thread on the sleeve some distance away from the fixed flange.

The sleeve with the wheel can now be detached or fixed by means of a single screwing operation.

According to another possibility, rapid fitting and removal can be achieved if the loose flange is fixable on the sleeve by means of a bayonet closure. In order to hold the sleeve, and thus the wheel, non-rotatably on the bearing housing, the fixed flange can be provided with a projection which faces the other flange and which can be accommodated in a corresponding recess in the sleeve.

The known bearing housing has flanges to which the wheel can be fixed. According to the invention, the sleeve is now provided with two external sleeve flanges.

In a wheel with spokes and the wheel hub according to the invention, the spokes are now fixed to the sleeve, preferably to the sleeve flanges.

It is known to provide a wheel hub with bearings with internal and external ball bearings. In this embodiment of the wheel hub a very flexible run of the wheel can be obtained if the bearing housing has spaces at both ends with stop faces facing away from each other for the external ball bearings, said spaces also having an internal screw thread into which a screw ring fits for pressing the external ball bearing against the appropriate stop face.

The fixing axle, it can be provided with two stop faces facing away from each other for the internal ball bearings, the distance between said stop faces essentially corresponding to those of the bearing housing.

The flexible running of the wheel can be even further beneficially influenced by the axle ends being provided with a flange for fixing the axle in a fork, in such a way that the flanges form reaction points for the fixing means of the fork. In this embodiment the forces with which the fork is fixed on the axle are not transmitted to the bearings, but are guided directly through the axle itself.

So-called disc wheels have recently come into use, particularly in cycle racing. The wheel hub according to the invention can also be used in such disc wheels if provision is made for the wheel disc to have a central hole by means of which it fits tightly around the sleeve. The sleeve is in this case preferably designed in two cylindrical halves which are each provided with a sleeve flange and which can be fitted on either side of the wheel disc, in such a way that the wheel disc can be held between the sleeve flanges. The advantage of this is that the loose and fixed flanges of the bearing housing do not directly contact the fragile lightweight material of the wheel disc, but contact the sleeve flanges which are better prepared for it.

According to a first preferred embodiment, provision is made for the two sleeve halves to be detachable from the wheel disc and when the loose flange is tightened on the bearing housing to be movable towards each other in such a way that the wheel disc can be clamped between the sleeve flanges.

According to a second preferred embodiment, provision can be made for sleeve halves to be fixed to the wheel disc, in such a way that the wheel disc with the sleeve flanges can be clamped between the loose and the fixed flange. The sleeve flanges are also absolutely non-rotatable relative to the material of the wheel disc during tightening of the loose flange on the bearing housing, so that damage thereof is largely avoided.

In order to achieve, for example, low weight and high strength, such a wheel disc can be designed in such a way that the wheel disc comprises shell halves which are symmetrical relative to the wheel centre plane at right angles to the central axis of the axle, and that the space formed between the shell halves is filled with foam material.

The wheel is preferably designed in such a way that the shell halves are fixed on the outside of the flanges, and the foam material on the inside of the flanges.

For the purpose of other weight savings, provision can be made for the apertures to a circular or sector-shaped, in such a way that the parts of the wheel disc lying between the apertures in the peripheral direction form spokes.

In order to increase the strength, in the last case the wheel can be designed in such a way that the spokes are provided adjacent to the apertures with reinforcement tubes extending approximately in radial directions.

In order to reduce the air resistance of the rotating wheel, one reinforcement tube of each spoke can always have a greater diameter than the other, in such a way that the spokes always taper in tangential cross-section.

The assembled wheel can be designed in such a way that the shell half edges are provided with edges which are parallel to the centre plane of the wheel and which are fixed to each other by a correspondingly shaped strip.

The shell halves are preferably made of a composite material of resin and fibres, and the foam material is PVC, such as, for example, aramid fibres or carbon fibres, or an epoxy resin.

The invention will be explained in greater detail below with reference to a number of examples of embodiments.

FIG. 1 shows an exploded side view of a wheel hub according to the invention with spokes fixed on it.

FIG. 2 shows a part of the wheel hub according to FIG. 1 suitable for the accommodation of a chain wheel.

FIG. 3 shows the wheel hub in cross-section for use on a disc wheel.

FIG. 7 shows a third variant of a disc wheel in side view and partly in cross section.

Figure 4:
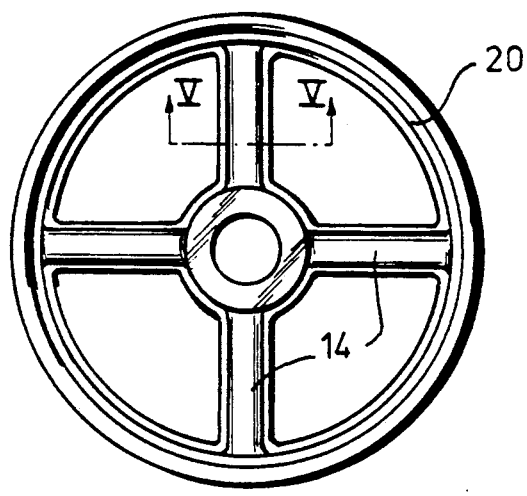
FIG. 4 shows on a smaller scale a first variant of a disc wheel in side view.

The wheel hub shown in FIG. 1 comprises a bearing housing 1 in which axle 2 is rotatably mounted. At one end bearing housing 1 has a fixed flange 3, and at the other end is provided with screw thread 4 onto which the loose flange 5 can be screwed. The sleeve 6 can be slid onto the bearing housing 1 and can then be clamped between the flanges 3, 5. Sleeve 6 has two sleeve flanges 7 to which spokes 8 are fixed in this embodiment.

FIG. 2 shows a variant of the bearing housing of FIG. 1. In this variant provision is made for a second screw thread 9, onto which a chain wheel (not shown) can be screwed.

The variant shown in FIG. 3 comprises a disc wheel, provided with a wheel hub according to FIG. 1, and a wheel disc 10 connected thereto. This wheel disc 10 is made up of two shell halves 11, for example of composite material with aramid or carbon fibres and an epoxy resin, and a foam core 12 of, for example, polypropylene. The sleeve now comprises two sleeve halves 13a, 13b, fitted on either side of foam core 12. The shell halves 11 cover the outside edge of the sleeve halves 13a, 13b and are glued thereto. The sleeve halves 13a, 13b are positioned in a rotated position relative to the wheel hub by means of pin 14 and recess 15.

The bearing housing 1 is supported by means of ball bearings 25 on the axle 2. The outer races of said bearings 25 can in this case each be pressed by the screw rings 22 against a breast 23. The axle 2 has a breast 23' against which bear innermost bearing halves. By means of a labyrinth seal (not shown), dirt, dust etc. are prevented from pentrating to the bearings.

The wheel can be fixed to a fork (not shown) by means of the flanges 24, in which case the bearings are then not placed under stress by the fixing forces exerted on the fork.

FIG. 4 shows a first variant of the form of the shell halves 11, with spokes 14 and rim 20.

Figure 5:
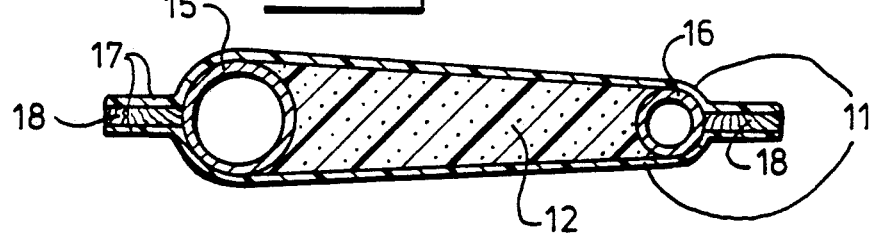
FIG. 5 shows cross-section on the line V—V of FIG. 4.

In cross-section the spoke 14 can taper, as shown in FIG. 5. The spoke 14 is also reinforced by means of the tubes 15, 16. It can also be seen that the shell halves have edges 17 which are fixed to each other by means of edge strips 18 formed matching said edges 17. The wheel rim is formed with a suitable recess, to accommodate the tire.

Figure 6:
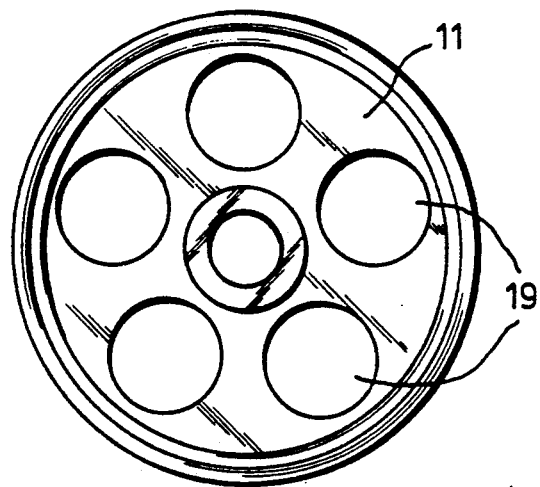
FIG. 6 shows a second variant of a disc wheel in side view.

FIG. 6 shows a variant in which the shells 11 are provided with circular recesses 19.

The variant shown in FIG. 7 has spokes 26 which are positioned staggered relative to the radii running out from the centre point of the wheel. In the direction of rotation indicated by the arrow the spokes have an aerodynamically beneficial drop-shaped cross-section 27. This wheel has a low air resistance, partly because the front edge of each spoke in the direction of rotation is relatively short. Of course, such a wheel can also have a different number of spokes, for example two.

I claim:

1. In a wheel hub for a bicycle, said hub comprising a cylindrical bearing housing which is rotatable about an axle, a detachable cylindrical sleeve which closely fits around the bearing housing for supporting the wheel, said sleeve being positioned on the bearing housing by means of a fixed housing flange on the bearing housing, the sleeve being detachable from the bearing housing; the improvement comprising a loose housing flange which uniformly clamps the sleeve onto the bearing housing parallel to the axle between both said flanges, cooperating surfaces of at least the loose housing flange and the adjacent sleeve end being of complementary shape such that upon tightening the loose housing flange a friction fit lock is established between at least said loose housing flange and said adjacent sleeve end thereby to clamp the sleeve onto the bearing housing between the flanges.

2. Wheel hub according to claim 1, wherein the sleeve at its ends has radial flanges which contact the fixed and loose housing flanges.

3. Wheel hub according to claim 2, wherein contacting surfaces of said housing flanges and sleeve flanges are planar and perpendicular to the axis of rotation of the hub.

4. Wheel hub according to claim 1, wherein the loose flange has an internally threaded aperture which can be fixed on an external screw thread on the sleeve some distance away from the fixed flange.

5. Wheel hub according to claim 1, wherein the loose flange can be fixed on the sleeve by means of a bayonet closure.

6. Wheel hub according to claim 1, wherein the fixed flange is provided with a projection which faces the other flange and which can be accommodated in a corresponding recess in the sleeve.

* * * * *